(12) United States Patent  (10) Patent No.: US 7,249,919 B2
Dawidziak et al.  (45) Date of Patent: Jul. 31, 2007

(54) RELEASE DEVICE FOR ACTUATING A CLAMPING DEVICE FOR TOOLS

(75) Inventors: Albrecht Dawidziak, Grossrinderfeld (DE); Heinrich Englert, Lauda-Königshofen (DE); Hubert Klein, Wertheim-Nassig (DE); Bernd Martin, Tauberbischofsheim (DE); Walter Rapp, Königheim-Gissigheim (DE); Ralf Wagner, Hardheim (DE)

(73) Assignee: Michael Weinig Aktiengesellschaft, Tauberbischofsheim (DE)

( * ) Notice: Subject to any disclaimer, the term of this patent is extended or adjusted under 35 U.S.C. 154(b) by 48 days.

(21) Appl. No.: 10/906,713

(22) Filed: Mar. 3, 2005

(65) Prior Publication Data

US 2005/0196247 A1  Sep. 8, 2005

(30) Foreign Application Priority Data

Mar. 3, 2004 (DE) .................... 10 2004 011 738

(51) Int. Cl.
*B23C 5/26* (2006.01)
(52) U.S. Cl. .................... 409/233; 408/239 R
(58) Field of Classification Search ........ 409/233, 409/231–232; 408/239 R, 239 A
See application file for complete search history.

(56) References Cited

U.S. PATENT DOCUMENTS

| 4,708,547 | A | | 11/1987 | Baron |
| 4,729,700 | A | * | 3/1988 | Hertel et al. ............... 409/233 |
| 4,748,357 | A | | 5/1988 | Kempken |
| 4,750,850 | A | * | 6/1988 | Husted ....................... 409/233 |
| 4,804,301 | A | * | 2/1989 | Hunt .......................... 409/233 |
| 4,913,605 | A | * | 4/1990 | Schwartzman .............. 409/233 |
| 6,234,731 | B1 | * | 5/2001 | Sakamoto ................... 409/233 |
| 2005/0141976 | A1 | * | 6/2005 | Feldmeier et al. .......... 409/233 |

FOREIGN PATENT DOCUMENTS

| DE | 1 099 309 | 2/1961 |
| DE | 1 281 783 | 10/1968 |
| WO | WO-03/049898 A1 * | 6/2003 |

* cited by examiner

*Primary Examiner*—Erica Cadugan
(74) *Attorney, Agent, or Firm*—Gudrun E. Huckett (57) ABSTRACT

A release device for actuating a clamping device for tools has at least one release element and a drive drivingly connected to the at least one release element for moving the at least one release element from a rest position into a release position in which a draw bar of the clamping device is moved against a clamping force into a disengaged position. The drive is an electric motor. The axis of the electric motor can be aligned with the axis of the release device but an angled arrangement of the electric motor and of the release device relative to one another is also possible.

29 Claims, 11 Drawing Sheets

Fig. 10

RELEASE DEVICE FOR ACTUATING A CLAMPING DEVICE FOR TOOLS

BACKGROUND OF THE INVENTION

The present invention relates to a release device for actuating a clamping device for tools, the release device comprising at least one release element movable by a drive from a rest position into a release position in which it moves a draw bar of the clamping device against a clamping force into a disengaged position.

Clamping devices are used for clamping tools at an interface of a tool spindle. The tool spindle generally has a HSK ("Hohischaftkegel"=hollow shank taper) receptacle for the tools that are drawn by a collet chuck into the spindle and clamped with a high axial drawing force. By the axial movement of the draw bar, the collet chuck segments are forced outwardly by means of a conical member seated on the draw bar. The collet chuck elements engage a clamping surface of the tool that is drawn by the draw bar into the spindle and clamped. The axial movement of the draw bar in the clamping direction is mechanically realized very safely and reliably by a spring packet, for example, a disk spring or plate spring packet.

In order to release the tool, the draw bar must be moved forwardly against the spring force. The collet chuck segments are released such that they can pivot inwardly. The tool is then ejected out of the tool receptacle across the remainder of the travel path by the draw bar. For axially moving the draw bar for releasing the tool, a release device is provided that is configured as a hydraulically actuatable release device embodied similar to a hydraulic cylinder. In order to exert during release no force or only minimal force onto the spindle bearing, a part of the release device is axially movably arranged in a receptacle and is axially supported by a coupling ring on a coupling screw seated in the tool spindle. In this way, the flow of forces when releasing the tool is not passing through the bearing but through this support.

It is also known to pneumatically actuate similar release devices.

The solution based on hydraulics is complex and expensive because of the need for a hydraulic unit with pump, oil container, valve block and the required conduit system. Moreover, leakage can cause functional disruptions. When the tool spindle is driven by belts, the hydraulic lines must be separated for changing the belts; this is difficult even when using hydraulic quick couplings and partially leads to soiling by oil.

The solution based on pneumatics operates without the medium oil but has otherwise the same disadvantages as the solution based on hydraulics. Moreover, the pneumatically operating release device, as a result of the relatively low pressures, must either be constructed to be very large for providing the required great forces or expensive special solutions are required, for example, double cylinders or pressure transmitters.

SUMMARY OF THE INVENTION

It is an object of the present invention to configure the release device of the aforementioned kind such that it is designed in a simple way, is inexpensive and has a compact configuration.

In accordance with the present invention, this object is solved in that the drive is an electric motor.

In the release device according to the invention, the drive is an electric motor that is simple, inexpensive and of a compact configuration and requires only an electrical supply line for operation. The expenditure for hydraulic drives and for a conduit system is eliminated. The release device according to the invention is preferably used in molding machines.

The invention will be explained in more detail in the following with the aid of two embodiments shown in the drawings.

DESCRIPTION OF PREFERRED EMBODIMENTS

With the stationary motor-operated release device described in the following, tools 1 can be released that are clamped at an interface 2 of a tool spindle 3 in a way known in the art. The tool spindle 3 has a spindle sleeve 4 (FIG. 1) in which a spindle shaft 5 is rotatably supported. In the spindle shaft 5, as is known in the art, a draw bar 6 is arranged that is surrounded about portions of its length by a spring packet 7, as is known in the art. This spring packet 7 is comprised advantageously of plate springs or disk springs. The spring packet is supported with one end on a guide disk 8 provided on a radially inwardly projecting shoulder 9 in the inner wall of the spindle shaft 5 (see FIG. 9). The opposed end of the spring packet 7 is supported by means of a disk 10 on the end face of a pressure member 11 that is in the form of a sleeve and projects through a coupling screw 12 that is screwed into the end of the spindle shaft 5 facing away from the interface 2 of the tool spindle 3. The end of the pressure member 11 projecting outwardly past the coupling screw 12 has a radial outwardly oriented flange 13. The release device acts on this flange 13 when the tool 1 clamped at the interface 2 is to be released.

Figure 9:
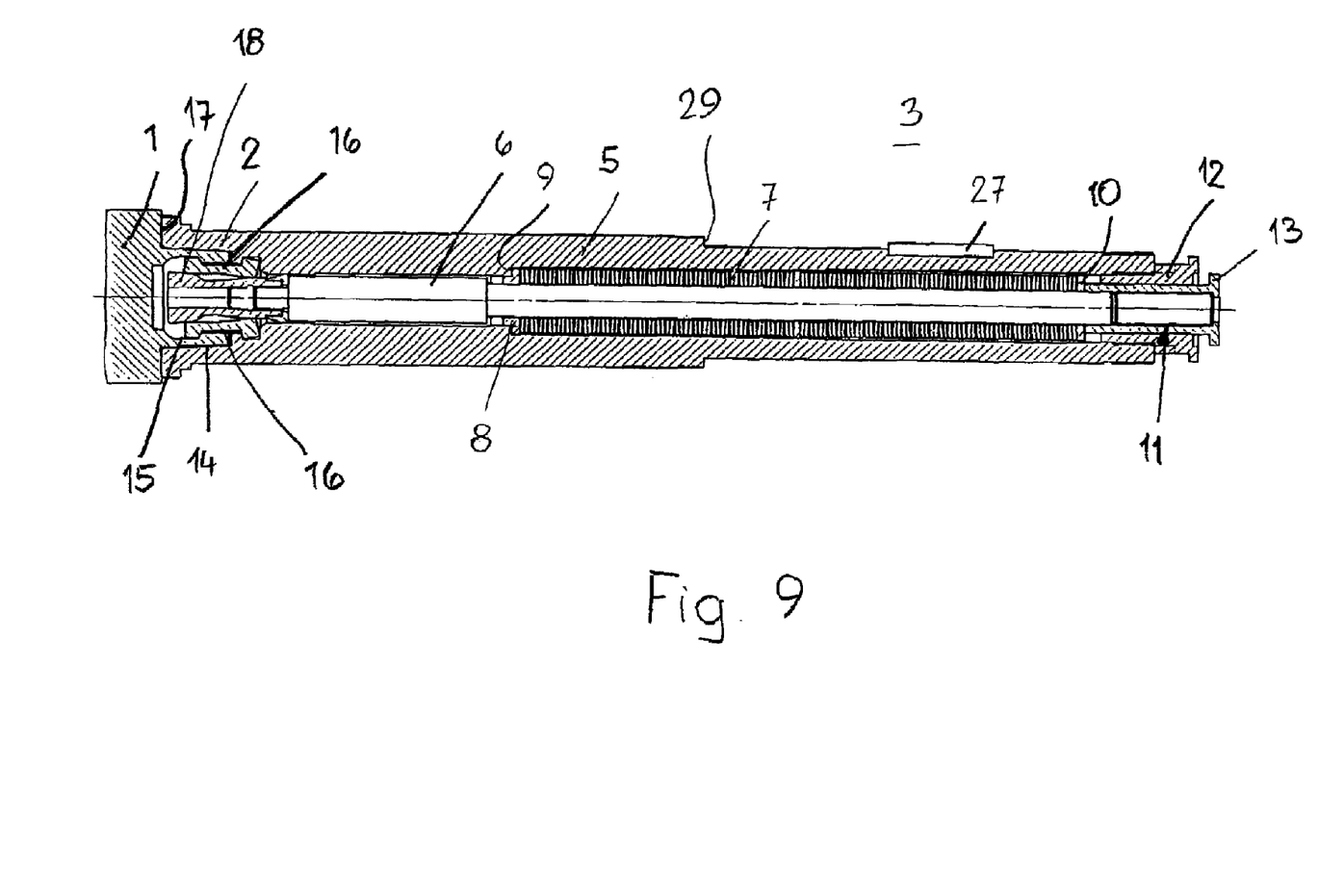
FIG. 9 is an axial section of the clamping device according to FIG. 1.

The interface 2 is advantageously configured as a HSK interface (hollow shank taper interface) and has a conical tool receptacle 14; the tool 1 engages the tool receptacle 14 with a matching conical shaft 15 (see FIG. 9).

In the area of the interface 2 collet chuck elements 16, supported in a way known in the art, are provided in the spindle shaft 5. The collet chuck elements 16 engage the tool shaft 15 and draw the tool 1 into the tool receptacle 14 in order to clamp it. The clamping force is applied by the spring packet 7. The tool 1 is pulled into the spindle shaft 5 until it rests with great force at the plane end face 17 of the spindle shaft 5.

The collet chuck elements 16 are pivoted by a cone member 18 into the clamping position illustrated in FIG. 9. The cone member 18 is seated fixedly on the draw bar 6. Preferably, the cone member 18 is screwed onto the draw bar 6. When the draw bar 6 is moved in the spindle shaft 5 by the force of the spring packet 7 to the right in FIG. 9, it spreads radially outwardly the collet chuck elements 16 that engage the tool shaft 15. When the draw bar 6 is moved by the release device against the force of the spring packet 7 in FIG. 9 to the left in a way to be described in the following, the cone member 18 provides enough space that the collet chuck elements 16 can pivot inwardly and disengage or release the tool shaft 15. At the end of the displacement movement, the cone member 18 pushes the tool 1 out of the spindle shaft 5; the tool 1 is seated with its shaft 15 with a self-locking action in the conical tool receptacle 14 of the interface 2.

A holder 19 (FIG. 1) that is part of a securing device 20 is attached to the spindle sleeve 4. A release device 21 is secured by means of the securing device 20. The clamping action of the tools 1 is released in a way to be described in the following by the release device 21. The tool spindle 3 and the release device 21 are positioned axially behind one another (FIG. 1) as well as coaxially to one another. On the side of the release device 21 that is facing away from the tool spindle 3, the drive 22 for the release device 21 is attached.

Figure 1:
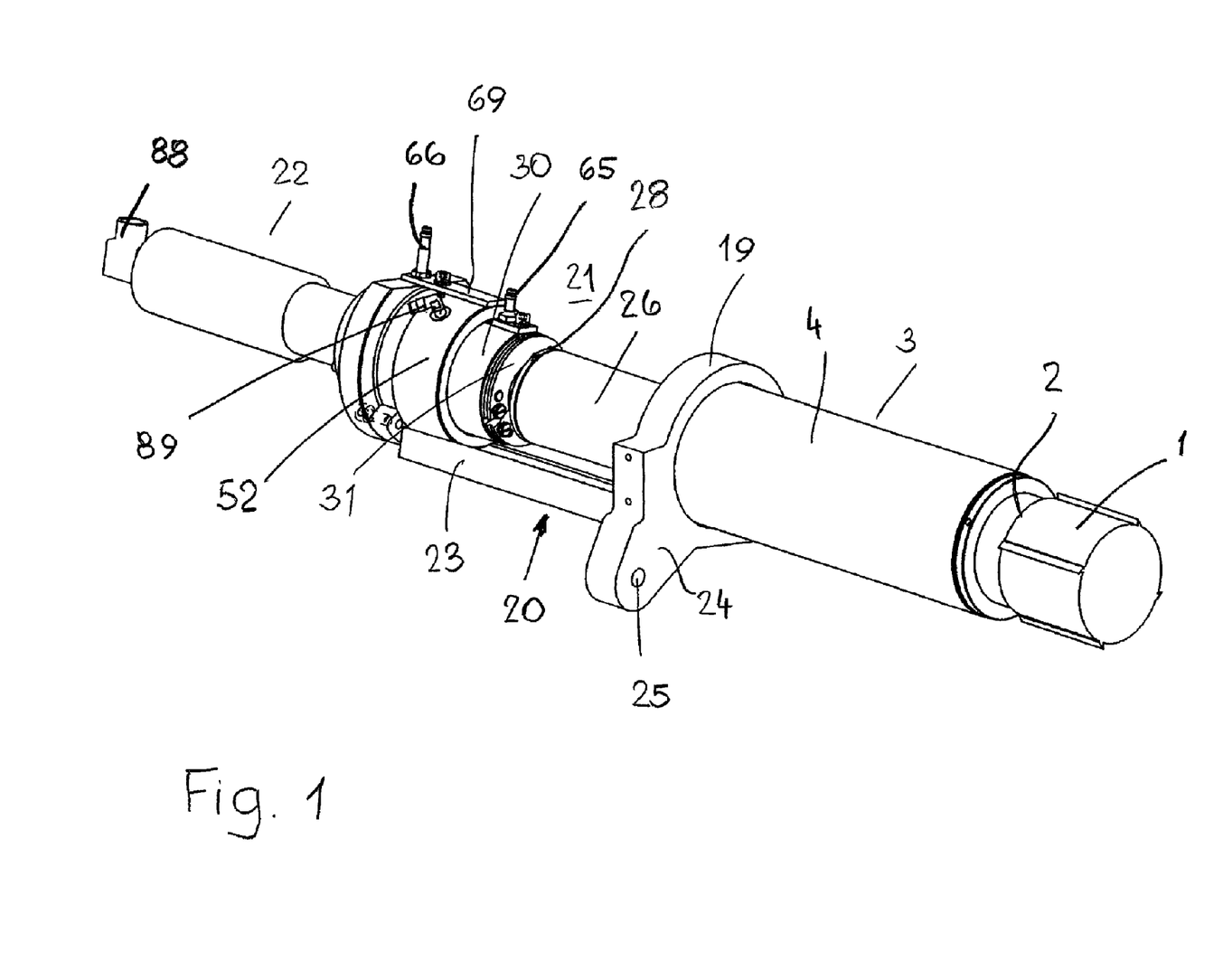
FIG. 1 is a perspective illustration of a release device according to the invention that is located between a motor and a tool spindle with tool clamping device.

The securing device 20 has a support 23 on which the release device 21 is resting and to which it is attached. The support 23 projects perpendicularly away from the holder 19. The holder 19 has a readily projecting cam 24 with a threaded bore 25 through which an axial adjusting spindle (not illustrated) projects with which the unit comprised of tool spindle 3, securing device 20, and release device 21 can be axially adjusted on a support (not illustrated).

Figure 4:
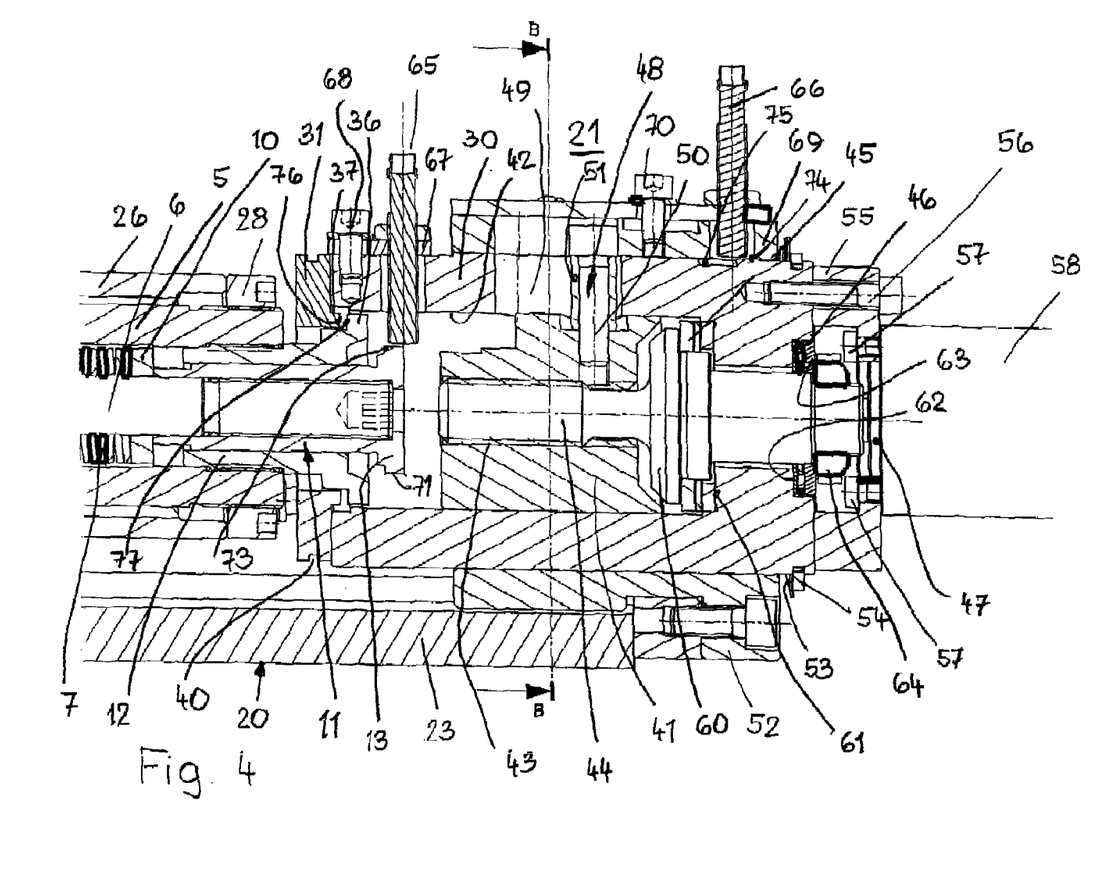
FIG. 4 shows a section along section line A-A of FIG. 7 of the release device according to the invention in its rest position.

The spindle sleeve 4 surrounds the forward area of the spindle shaft 5. In this area, the spindle shaft 5 has a greater wall thickness than in the adjoining area (FIG. 9) on which a pulley 26 (FIG. 1) is fixedly secured. For the fixed attachment of the pulley 26 on the spindle shaft 5, the area of the spindle shaft 5 having reduced wall thickness is provided with at least one positive-locking element 27 (FIG. 9) that realizes the fixed attachment of the pulley 26. By means of a pulley nut 28 the pulley 26 is axially secured on the spindle shaft 5 (FIG. 4). The pulley nut 28 is screwed onto the end of the spindle shaft 5 facing the release device 21. With its other end, the pulley 26 rests with interposition of bearings (not illustrated) on the radial outwardly oriented collar 29 (FIG. 9) that is provided at the transition from the thinner to the thicker wall area of the spindle shaft 5.

Figure 5:
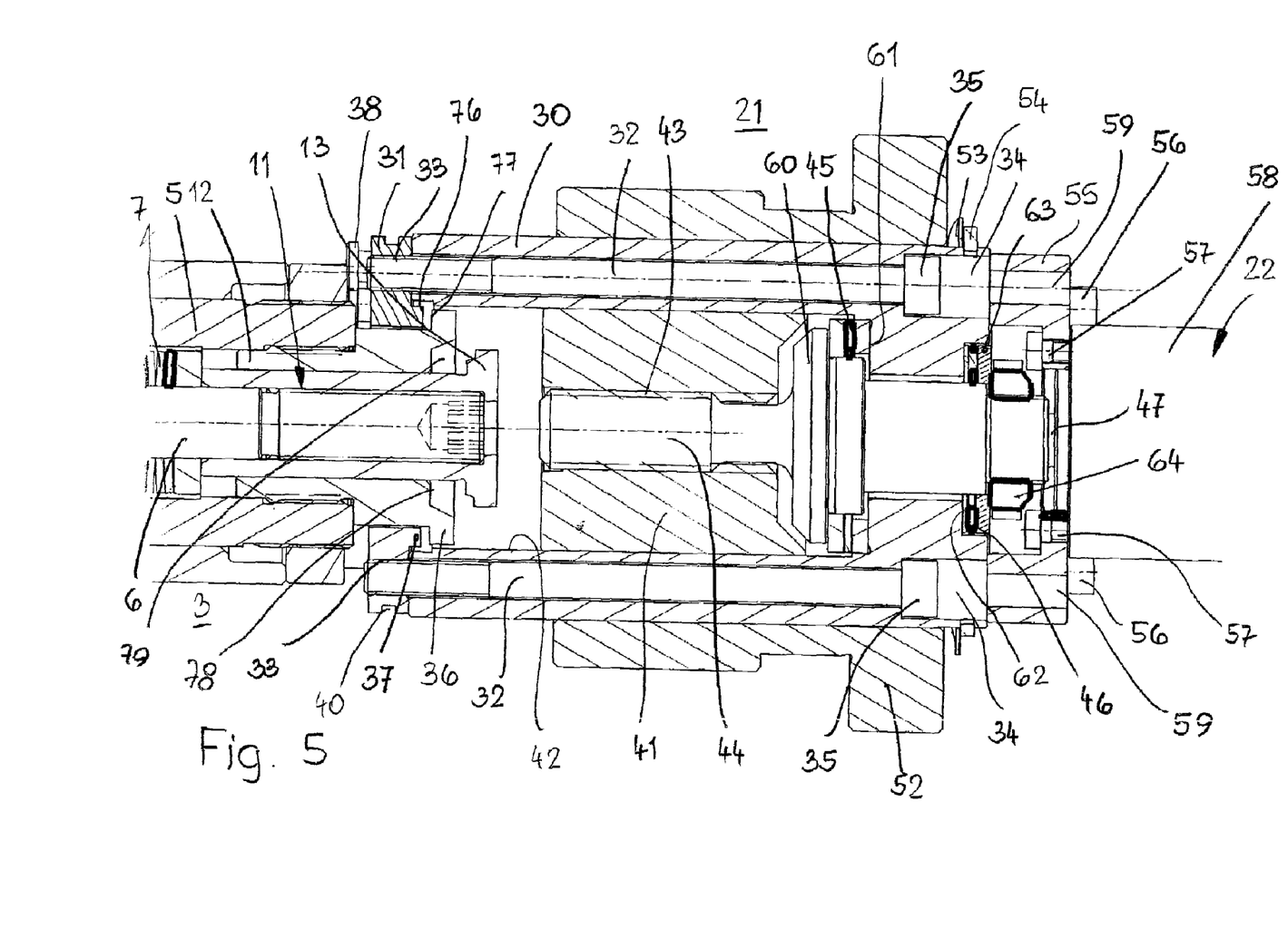
FIG. 5 shows a section along the section line C-C of FIG. 7 of the release device in its rest position.

As illustrated in FIGS. 4 and 5, the coupling screw 12 and the pressure member 11 project axially past the spindle shaft 5 into the release device 21. The pressure member 11 is moved relative to the coupling screw 12 so far in the direction toward the release device 21 that the flange 13 of the pressure member 11 in the rest or basic position (FIGS. 4 and 5) is spaced from the coupling screw 12.

The release device 21 is mounted on the securing device 20 such that the coupling screw 12 and the pressure member 11 project into a housing 30 of the release device 21. On the end face of the housing 30 that is facing the tool spindle 3, a coupling element that is formed as a coupling ring 31 is positioned and attached by fastening screws 32 (FIG. 5) to the end face of the housing. The coupling ring 31 has threaded bores 33 into which the fastening screws 32 are screwed with their free end. In order for the coupling ring 31 to be demounted while the release device 21 is attached, the fastening screws 32 can be accessed from the opposite side of the housing 30. In this area, the housing 30 has recesses 34 for receiving the screw heads 35 that rest against the bottom of the recesses 34.

The coupling screw 12 is surrounded with minimal play by the coupling ring 31. The coupling screw 12 is provided at the free end positioned outside of the tool spindle 3 with a radial outwardly oriented flange 36. In the basic position or rest position of the release device 21 illustrated in FIGS. 4 and 5, the flange 36 is positioned with axial spacing opposite an axially projecting collar 37 of the coupling ring 31.

Figure 2:
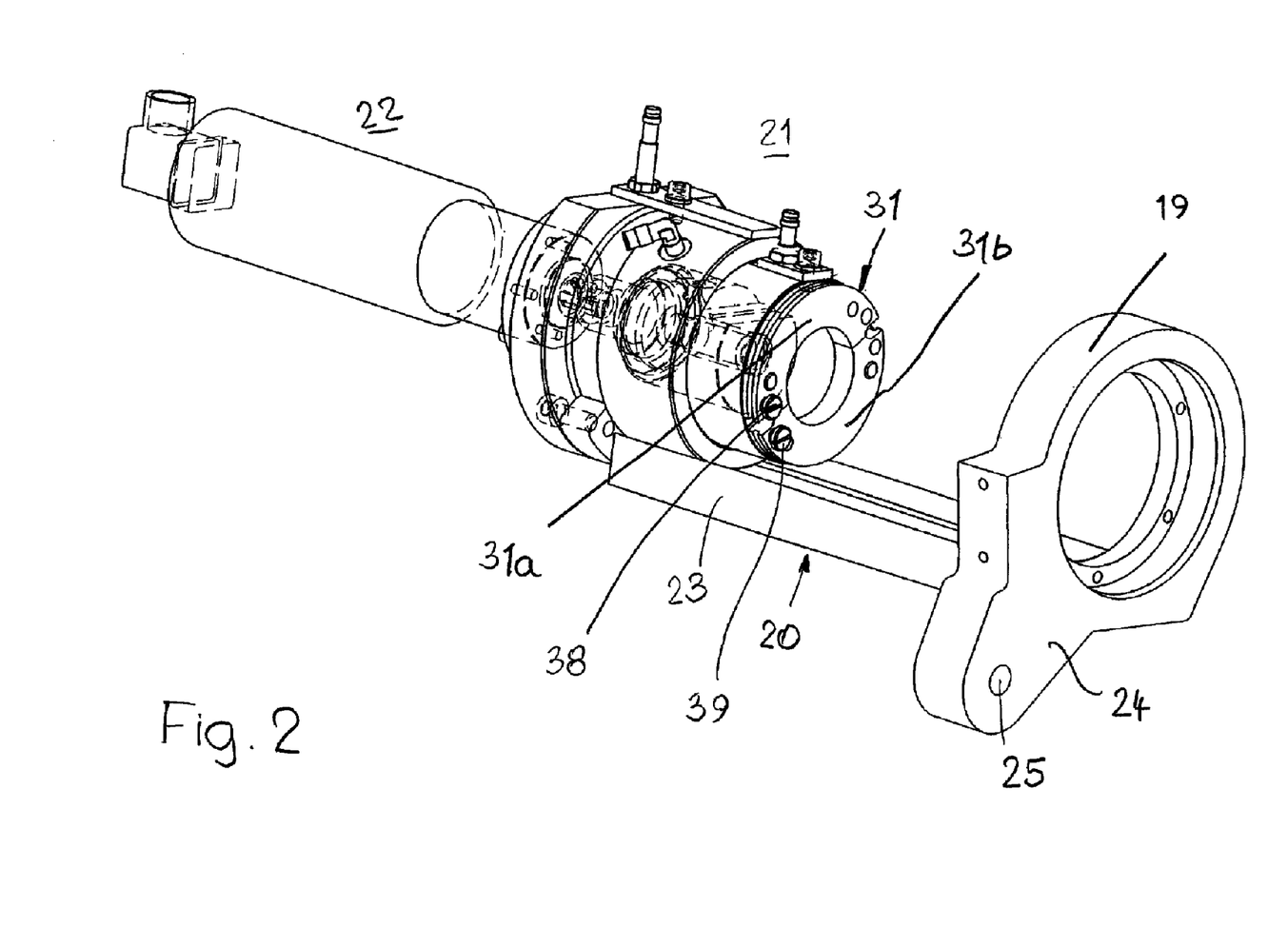
FIG. 2 is a perspective illustration of the release device together with its drive in accordance with the present invention.

In order for the coupling ring 31 to be removable after release of the fastening screws 32, it is of a partitioned configuration and has two coupling ring parts 31a, 31b (FIG. 2) which are pivotably supported about an axial pivot axis 38, 39 on the end face of the housing 30. The pivot axes 38, 39 can be formed, for example, by set screws that are inserted into appropriate openings in the end face of the housing 30. After removal of the fastening screws 32, the substantially semi-circular coupling ring parts 31a, 31b can be moved on the pivot axes 38, 39 so far that the collar 37 projects from the housing 30. Subsequently, the coupling ring parts 31a, 31b can be pivoted outwardly about the pivot axes 38, 39 so that the release device 21 can be removed.

In the second configuration, the coupling ring parts 31a, 31b of the coupling ring 31 are not pivotable; they can only be screwed on and unscrewed from the housing 30. In order for the two coupling ring parts 31a, 31b to be held together as a unit, the coupling ring 31 is provided on its circumferential surface with an annular groove 40 into which an elastic ring, preferably, an O-ring, is inserted that secures the two coupling ring parts 31a, 31b relative to one another.

In the housing 30 of the release device 21 a release element in the form of an ejection nut 41 is provided that rests against the inner wall 42 of the housing 30. The ejection nut 41 has a central threaded through bore 43 that is engaged by a threaded spindle 44. The threaded spindle 44 is supported by axial bearings 45, 46 in the housing 30. The threaded spindle 44 is coupled to a drive shaft 47 of the drive 22. Depending on the rotational direction of the threaded spindle 44, the ejection nut 41 is moved axially within the housing 30 in a direction toward the pressure member 11 or away from it.

The ejection nut 41 has a radially projecting torque support 48 (FIG. 4) that has a radial outer end engaging an axially extending slot 49 of the housing 30. The width of this slot 49 corresponds to the cross-sectional width of the torque support 48 in the engagement area. The torque support 48 has a bolt 50 fastened in the ejection nut 41 and radially projecting past the nut 41; it can be screwed into the ejection nut 41 or pressed into it. A bushing 51 is seated on the bolt 50 and is guided substantially without play in the slot 49 of the housing 30. The length of the slot 49 in the axial direction matches at least the maximum displacement travel of the ejection nut 41 within the housing 30.

The housing 30 of the release device 21 is seated in a receptacle formed as a receiving flange 52 that is fastened on the securing device 20. The housing 30 is axially movable to a limited extent relative to the receiving flange 52 when the tool 1 clamped in the tool spindle 3 is to be released or disengaged. The housing 30 is loaded by a spring 53, preferably a disk spring, in the direction toward the drive 22 to the right. The spring 53 is supported on the receiving flange 52 as well as on a securing ring 54 that is seated on the exterior side of the housing 30.

The drive 22 is attached to the end of the release device 21 facing away from the tool spindle 3. A motor flange plate 55 of the drive 22 rests against the end face of the housing 30; the drive 22 is secured by screws 56 to the housing 30. The flange plate 55 itself is secured by screws 57 to the end face of the motor housing 58. The flange plate 55 has at the level of the fastening screws 32 axial through openings 59 (FIG. 5) so that the fastening screws 32 are accessible from the exterior when the flange plate 55 is mounted. The through openings 59 are located in an area that projects radially past the motor housing 58.

The threaded spindle 44 has a collar 60 positioned in an area outside of the ejection nut 41; the axial bearing 45 is axially supported on the collar 60. On the opposite side, the axial bearing 45 is supported on a radial inwardly projecting shoulder surface 61 of the housing 30.

The axially neighboring axial bearing 46 is axially supported on an additional radial inwardly projecting shoulder surface 62 of the housing 30 as well as on a nut 64 screwed onto the threaded spindle 44.

The release device 21 is provided with two sensors 65 and 66 (FIG. 4) that project radially from the release device 21. The sensor 65 projects at the level of the pressure member 11 into the housing 30 and is secured by a sensor plate 67 that is attached by at least one screw 68 on the housing 30 adjacent to the coupling ring 31.

The other sensor 66 is seated in a sensor plate 69 that is attached with the least one screw 70 on the receiving flange 52. Both sensors 65, 66 are advantageously inductively operating sensors. The sensor 65 has two functions. When the tool 1 is clamped properly in the tool spindle 3, the flange 13 of the pressure member 11 is in the position illustrated in FIGS. 4 and 5 in which position the sensor 65 detects a switching surface 71 of the pressure member flange 13. The switching surface 71 is formed by the circumferential surface of the pressure member flange 13. The sensor 65 has also the task to monitor the ejection process or action of the tool 1 out of the tool spindle 3.

The sensor 66 serves for switching off the drive 22 when the housing 30 is in its basic position illustrated in FIGS. 4 and 5. The switching process is triggered by a switching surface 74 that adjoins, in the direction toward the drive 22, an outer recess 75 in the housing 30.

The sensors 65, 66 can be advantageously adjusted to a limited extent in the axial direction of the housing 30 or of the receiving flange 52 so that a simple precise positioning of the sensors 65, 66 relative to the switching surfaces 71 and 74 is ensured.

In FIGS. 4 and 5, the initial position (basic position) of the release device 21 is illustrated when the tool 1 is clamped properly in the tool spindle 3. The drive or motor 22 is switch off so that the threaded spindle 44 does not rotate. The ejection nut 41 has axial spacing from the flange 13 of the pressure member 11. In this basic (rest) position, the flange 36 of the counter coupling element in the form of the coupling screw 12 has axial spacing from the collar 37 of the coupling element in the form of the coupling ring 31. The opposed support surfaces 76, 77 of the collar 37 and the flange 36 do not contact one another in this position. Accordingly, the coupling screw 12 that is fixedly connected to the spindle shaft 5 can rotate about its axis without impairment when the spindle shaft 5 rotates. Since the coupling ring 31 surrounds the coupling screw 12 with minimal radial play, the rotational movement of the coupling screw 12 is also not impaired by the coupling ring 31. However, the minimal play results in an excellent sealing action of the interior of the release device 21 and prevents thus penetration of dirt, dust, cuttings, and the like.

Figure 6:
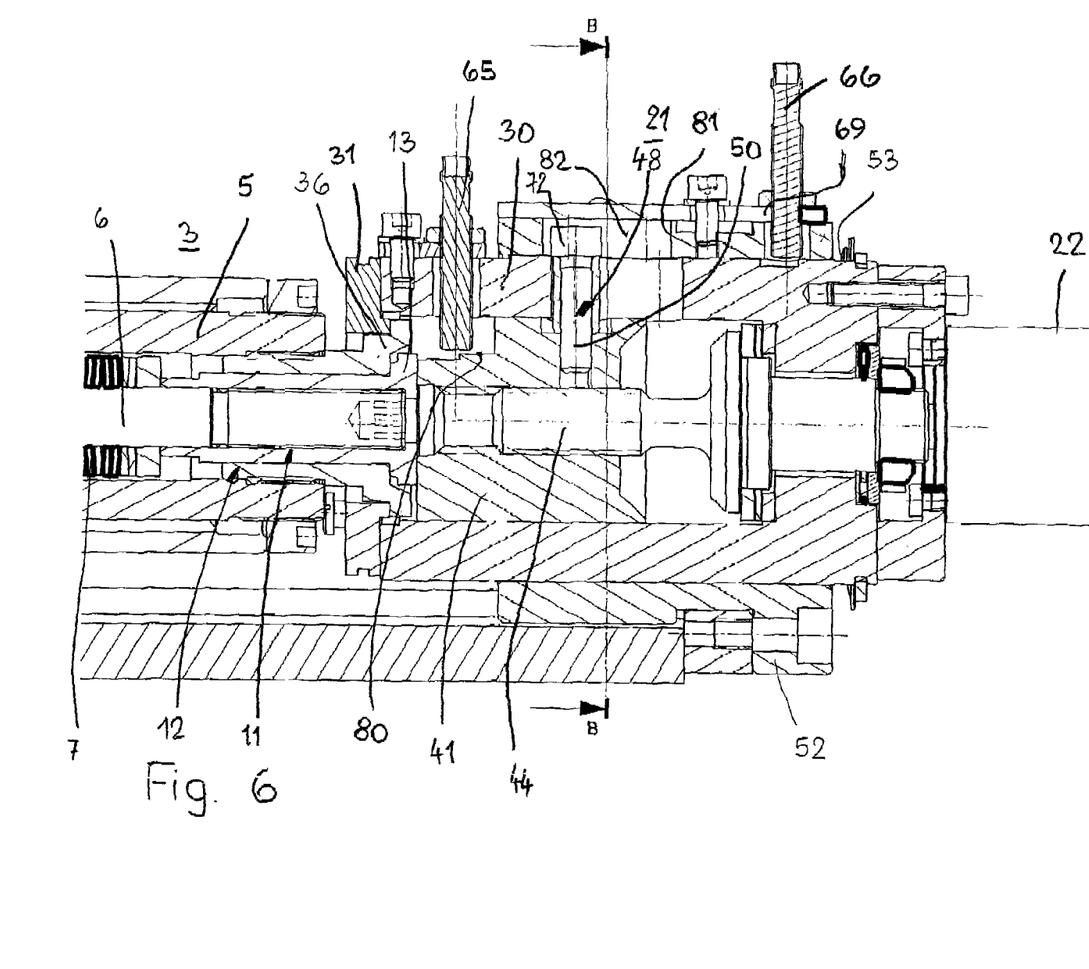
FIG. 6 is a section along the line A-A of FIG. 7 of the release device according to the invention in the release position.
Figure 7:
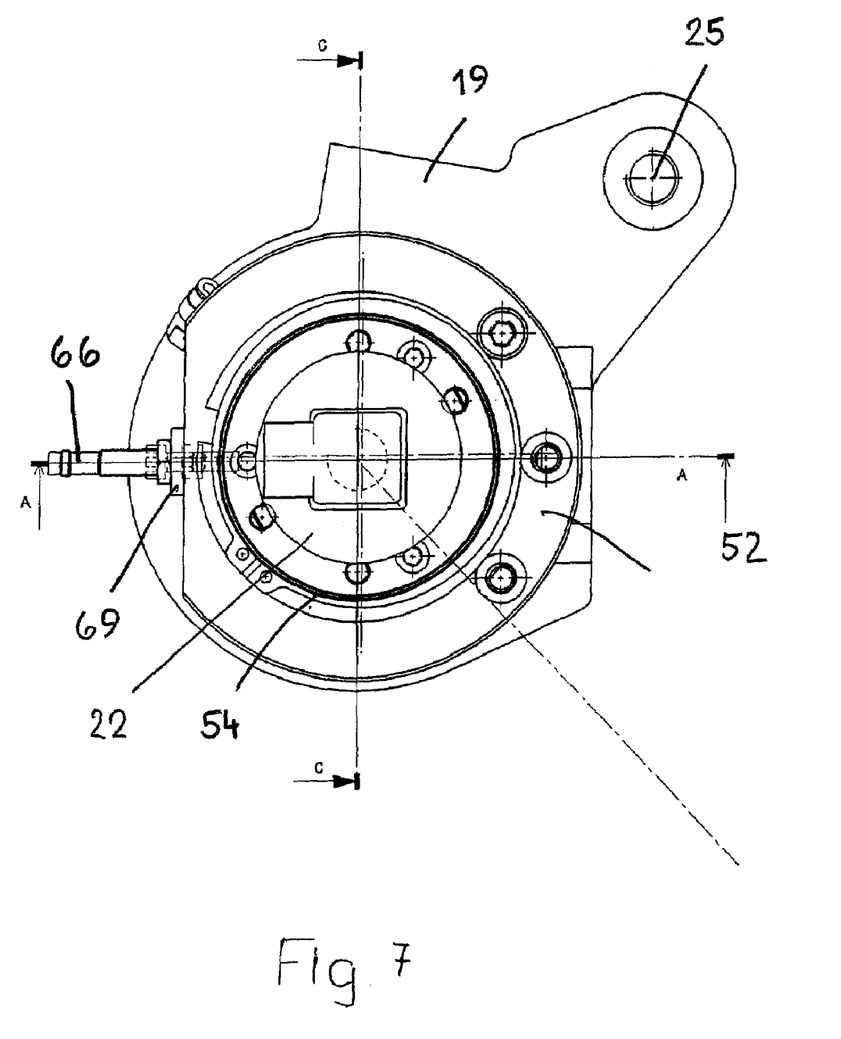
FIG. 7 shows an end view of the release device according to the invention.

When the tool 1 is to be removed from the tool spindle 3, first the drive of the spindle shaft 5 is switched off so that the shaft 5 and thus also the coupling screw 12 and the pressure member 11 stand still. Subsequently, the electric motor 22 is switched on so that the drive shaft 47 and the threaded spindle 44 fixedly connected thereto are driven in rotation. The threaded spindle 44 is rotated such that the ejection nut 41 is moved in the direction toward the pressure member 11 within the housing 30. The torque support 48 ensures that the ejection nut 41 is reliably axially moved but not rotated about its axis. As soon as the ejection nut 41 rests with its end face against the flange 13 of the pressure member 11, the entire housing 30 with the threaded spindle 44 and the drive motor 22 is moved to the right in FIGS. 4 and 5 until the radial support surface 76 formed by the end face of the collar 37 of the coupling ring 31 rests against the radial support surface 77 of the flange 36 of the coupling screw 12. In this contact position of the two support surfaces 76, 77 flow of forces circuit is closed. Since the threaded spindle 44 is continued to be driven by the drive motor 22, the force for compression of the spring packet 7 is now generated within the tool spindle 3. The ejection nut 41 is moved father in the direction toward the tool spindle 3 until the drive motor 22 upon surpassing an adjustable maximal current is automatically switched off. This maximum current occurs when the pressure member 11 with its flange 13 comes to rest against the bottom 78 of a recess 79 (FIG. 5) at the end face of the coupling screw 12. The coupling screw 12 forms thus the stop for the axial adjustment of the pressure member 11 and of the ejection nut 41 and ensures in this way a defined position of the draw bar 6 with the cone member 18 for ejection and insertion of the tool 1. This disengaged position of the draw bar is illustrated in FIG. 6. The housing 30 is moved relative to the receiving flange 52. The cone member 18 on the draw bar 6 releases the collet chuck elements 16 so that they can be pivoted into the position in which the tool 1 is released. he tool 1 is thus ejected on the last portion of the displacement stroke of the draw bar 6 out of the receptacle 14 of the spindle shaft 5.

In the described configuration, the drive motor 22 is witched off when a maximum current is surpassed. However, it is also possible to employ the sensor 65 for switching off the motor during the release process. It then provides a switch-off signal to the motor 22 when a switching surface 80 (FIG. 6) provided on the ejection nut 41 reaches the detection area of the sensor 65.

After the tool 1 has been ejected from the tool receptacle 14, it can be removed from the tool spindle 3. A new tool 1 can be inserted subsequently into the tool receptacle 14. The motor 20 is then switched for providing a reverse direction of rotation so that the threaded spindle 44 rotates such that the ejection nut 41 is moved back into the release position illustrated in FIGS. 4 and 5. The spring packet 7 moves the draw bar 6 and thus the pressure member 11 in the direction toward the release device 21 by the same travel stroke as the ejection nut 41 moves back in the housing 30. In this way, the new tool 1 is clamped in the tool receptacle 14. As soon as the head 72 of the bolt 50 of the torque support 48 contacts the edge 81 of the slot 82 to the right in FIG. 6 within the receiving flange 52, the housing 30 with the coupling ring 31 is moved again in the direction toward the tool spindle 3. The head 72 of the bolt 50 prevents rotation of the housing 30 relative to the receiving flange 52 in which the head 72 is received with minimal play in the slot 82. Subsequently, the position according to FIGS. 4 and 5 is reached again in which the support surfaces 76, 77 of the coupling ring 31 and of the pressure member 11 are spaced from one another. As soon as the switching surface 74 of the housing 30 reach the measuring area of the sensor 66 (FIG. 4), the drive 22 is switched off. Since the support surfaces 76, 77 are free, the spindle shaft 5 can again rotate freely. In accordance with the described movements, the switching surface 80 of the ejection nut 41 moves out of the measuring area of the sensor 65 while the switching surface 71 of the pressure member 11 moves into the detection area of the sensor 65 when the tool 1 is properly clamped. Now the basic position according to FIGS. 4 and 5 is reached. The sensor 65 sends a release signal for switching on the tool spindle 3.

The sensor 66 in the illustrated embodiment is stationarily arranged on the receiving flange 52. It is however also possible to provide the sensor 66 so as to travel together with the ejection nut 41.

Figure 3:
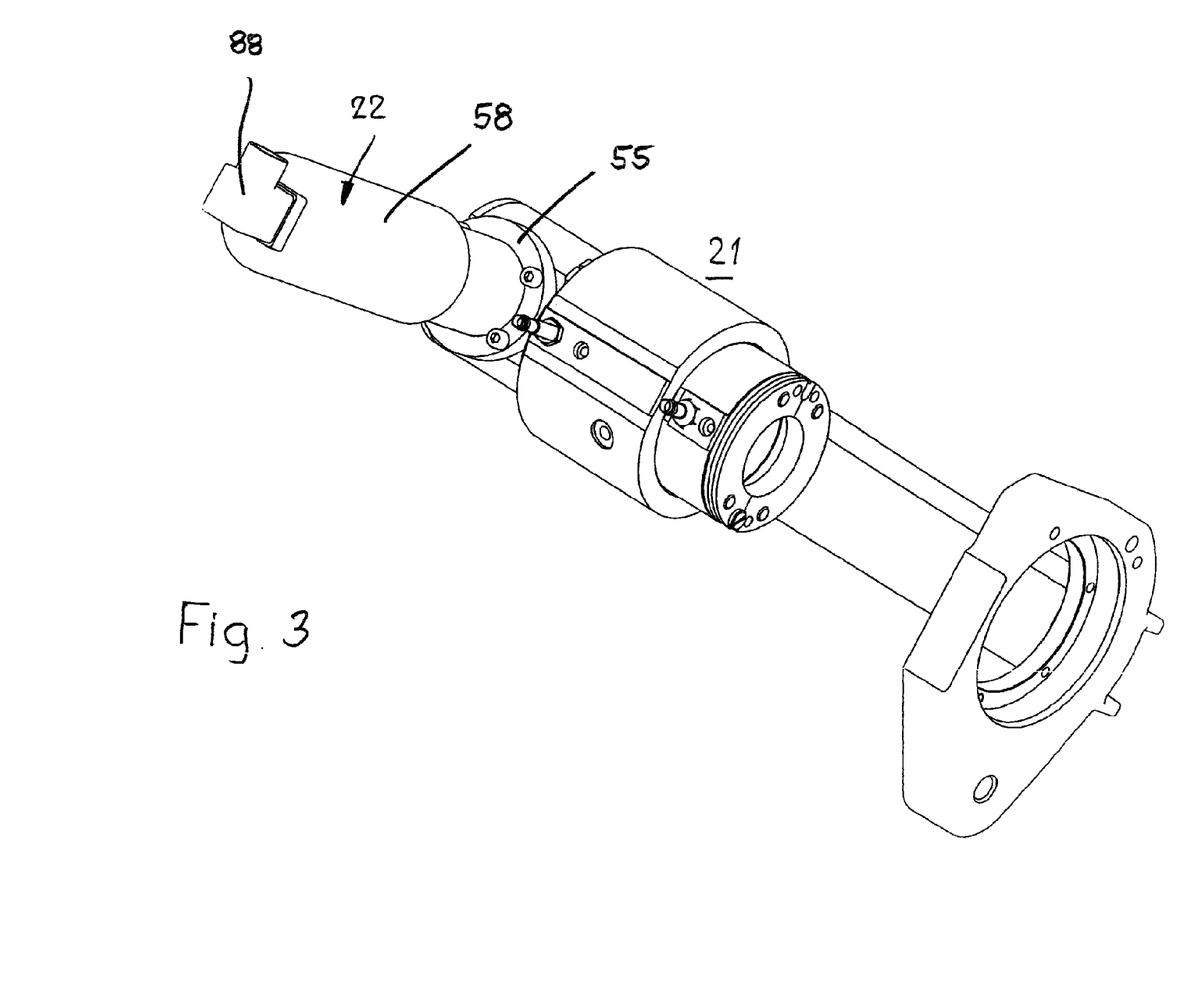
FIG. 3 is an illustration corresponding to FIG. 2 of a release device according to the invention having a drive that is arranged at a right angle to the release device.
Figure 10:
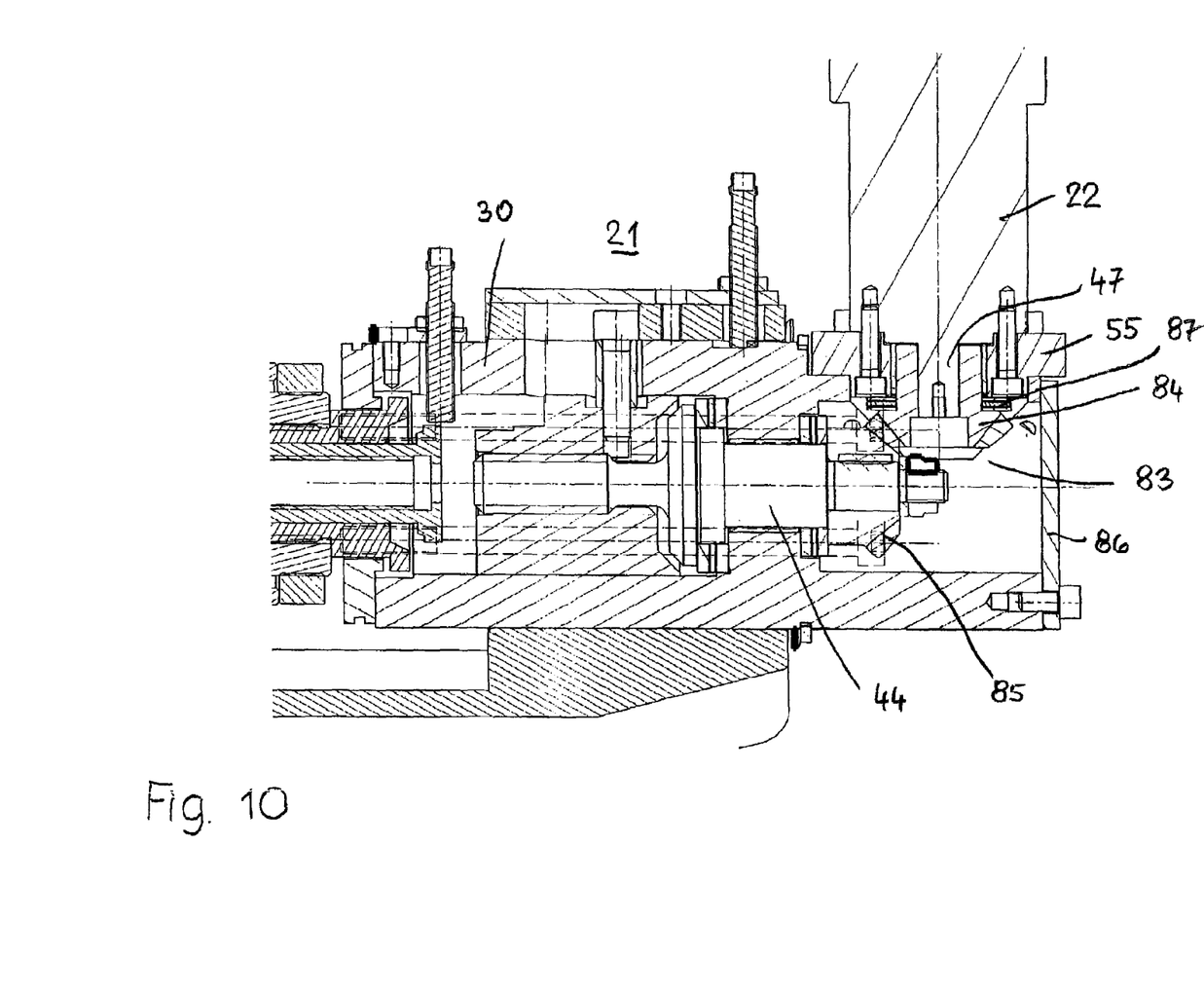
FIG. 10 is a longitudinal section of the inventive release device according to FIG. 3.

The FIGS. 3 and 10 show an embodiment which differs from the afore described embodiment such that the electric motor 22 does not adjoin in the longitudinal direction the release device 21 but is positioned at an angle thereto, preferably a right angle as shown in FIG. 10. Angles other than a right angle are possible. To accomplish this, the motor shaft 47 (FIG. 10) is drivingly connected by a bevel gear arrangement 83 to the threaded spindle 44. A bevel gear 84 is seated on the motor shaft 47 and meshes with a bevel gear 85 mounted fixedly on the threaded spindle 44.

In contrast to the preceding embodiment, the flange plate 55 is not flanged to the end face of the housing 30 but to its circumferential surface that has an appropriate flattened area. At the end face, the housing 30 of the release device 21 is closed by cover 86. The bevel gear 84 that is fixedly mounted on the motor shaft 47 is axially supported by a needle bearing 87.

As in the preceding embodiment, on the free end of the motor housing 58 a connector plug 88 is provided.

The configuration according to FIGS. 3 and 10 is characterized by having a very short length. It can be, for example, used in connection with vertical spindles in molding machines.

The release device 21 is of the same configuration as in the preceding embodiment.

Figure 8:
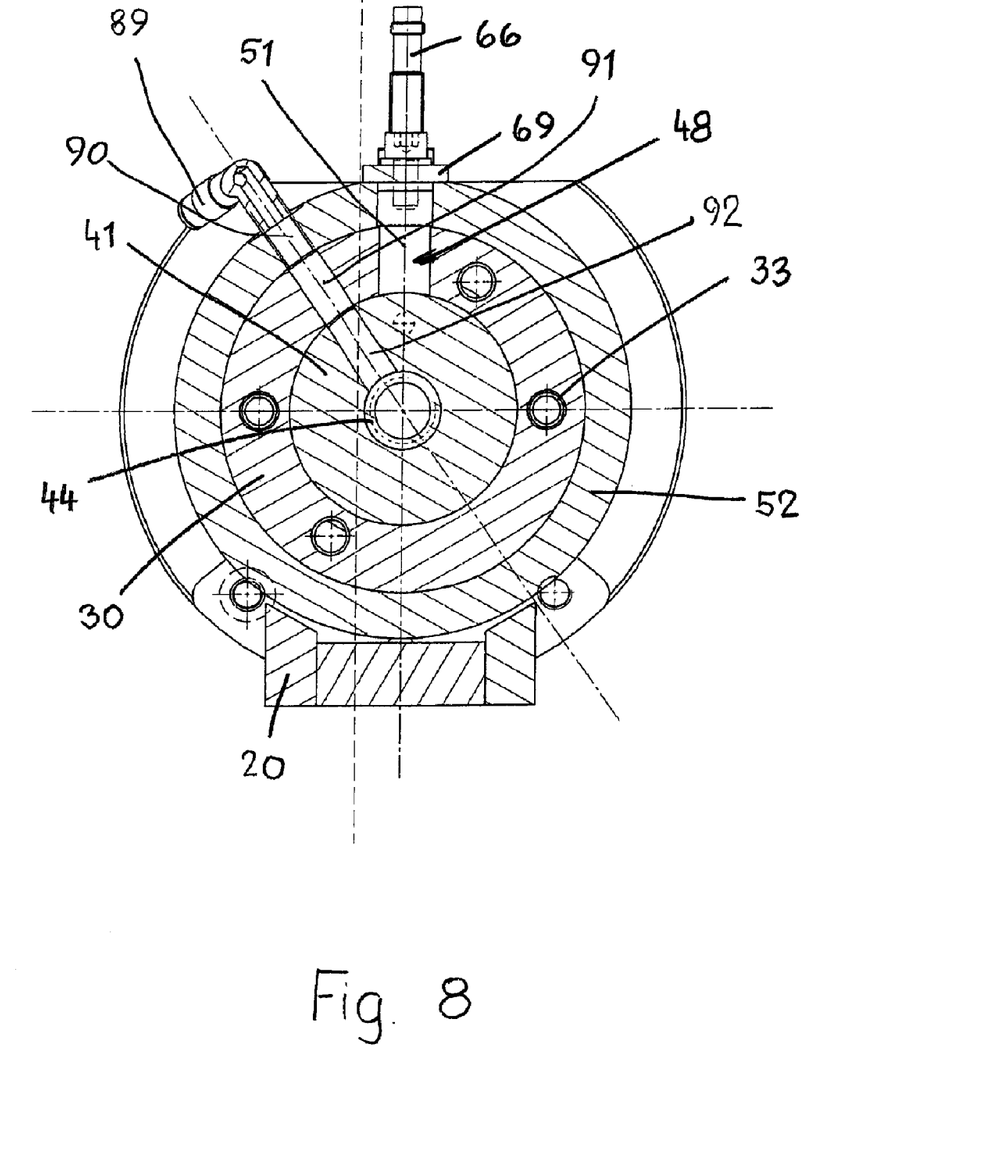
FIG. 8 is a section along the line B-B of FIG. 4.

As illustrated in FIGS. 1 and 8, on the receiving flange 52 a lubricant nipple 89 is provided; lubricant bores 90 through 92 are connected to the nipple 89. The bores 90 to 92 penetrate the receiving flange 52, the housing 30, and the ejection nut 41. In this way, the ejection nut 41 and the threaded spindle 44 can be lubricated.

Figure 11:
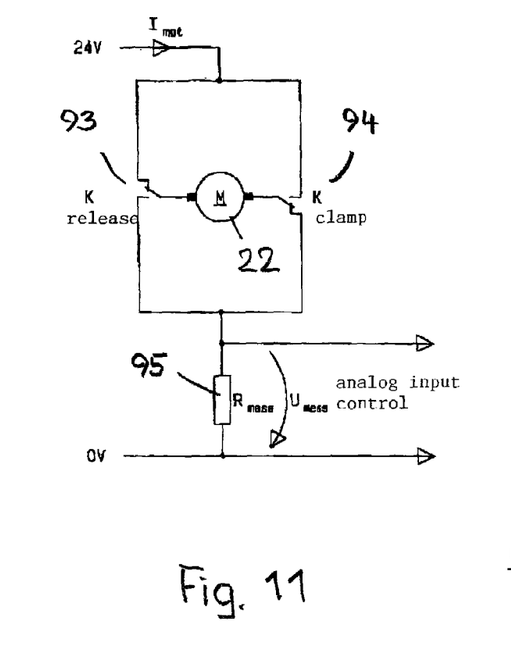
FIG. 11 is a schematic illustration of a circuit diagram of the drive of the release device according to the invention.
Figure 12:
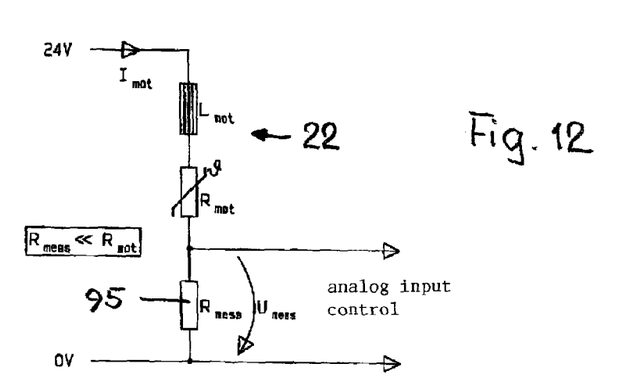
FIG. 12 is a substitute circuit diagram of the motor according to FIG. 11.
Figure 13:
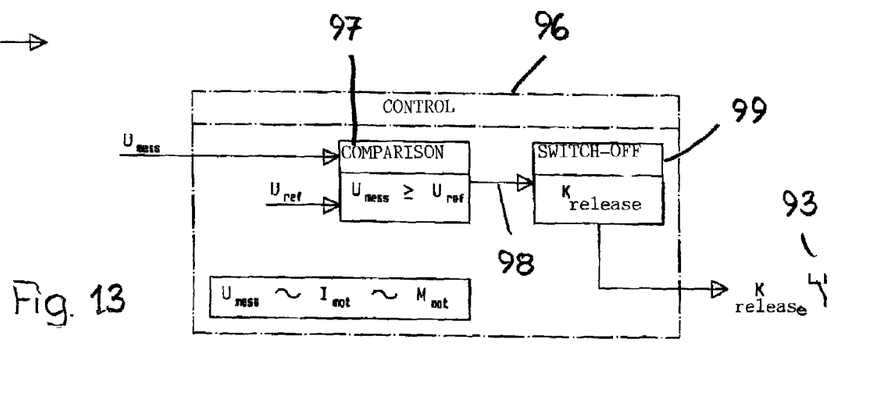
FIG. 13 is a schematic illustration of a control device of the release device according to the invention.

FIGS. 11, 12, and 13 show a part of the preferred control for the release device. The drive 22 (FIGS. 11 and 12) is operated with a motor current $I_{mot}$. With two switching elements 93, 94 (relays in the illustrated embodiment), the rotational direction of the drive 22 and thus the rotational direction of the threaded spindle 44 can be adjusted. The motor is comprised in the substitute circuit diagram of an inductive resistor $L_{mot}$ and a resistor $R_{mot}$ that is changeable as a function of the motor temperature. Connected in series to the motor is a measuring shunt $R_{mess}$ 95. This shunt 95 is significantly smaller than the motor resistor $R_{mot}$ so that the motor is not affected in any significant way with regard to its output.

As a function of the motor current $I_{mot}$, a voltage $U_{mess}$ is measured at the measuring shunt $R_{mess}$ 95 and is supplied to a control device 96. The control device comprises a comparator 97 in which the voltage $U_{mess}$ is compared to a reference voltage $U_{ref}$. As soon as the voltage $U_{mess}$ becomes greater than the reference voltage $U_{ref}$, the comparator 97 provides a signal 98 to a switch-off module 99. It generates a switch-off signal with which the switching element 93 is actuated and the motor is switched off.

The voltage $U_{mess}$ is proportional to the motor current $I_{mot}$ that, in turn, is proportional to the motor torque $M_{mot}$. With the aid of the reference voltage $U_{ref}$, the maximum possible voltage $U_{mess}$ can be adjusted; accordingly, the switch-off current of the motor can be adjusted. In this way it is ensured that the motor is loaded only up to a permissible motor current and motor torque.

Since the measuring shunt $R_{mess}$ 95 is significantly smaller than the motor resistor $R_{mot}$, the drive 22 is moreover protected against overload.

While specific embodiments of the invention have been shown and described in detail to illustrate the inventive principles, it will be understood that the invention may be embodied otherwise without departing from such principles.

What is claimed is:

1. A release device for actuating a clamping device for tools, the release device comprising:

a housing;

at least one release element arranged in the housing;

an electric motor drivingly connected to the at least one release element for moving the at least one release element from a rest position into a release position in which a draw bar of the clamping device is moved against a clamping force into a disengaged position;

at least one coupling element provided on the housing and a counter coupling element connected to a tool spindle;

wherein the at least one coupling element and the counter coupling element have a common axis and are axially spaced from one another in the rest position of the at least one release element;

a pressure member fixedly connected to the draw bar and protecting through the counter coupling element and facing the at least one release element, wherein the at least one release element, when moved into the release position, acts on the pressure member to move the at least one coupling element into a contact position with the counter coupling element in which contact position the at least one release element causes the draw bar to move into the disengaged position.

2. The release device according to claim 1, wherein an axis of the electric motor is positioned parallel to an axis of the at least one release element.

3. The release device according to claim 2, wherein the axis of the electric motor and the axis of the at least one release element are aligned with one another.

4. The release device according to claim 1, wherein an axis of the electric motor and an axis of the at least one release element are angled relative to one another.

5. The release device according to claim 4, wherein the axis of the electric motor and the axis of the at least one release element are positioned at a right angle to one another.

6. The release device according to claim 1, wherein the release device has a longitudinal axis defining an axial direction, wherein the clamping device, the at least one release element, and the electric motor are arranged sequentially behind one another in the axial direction.

7. The release device according to claim 1, further comprising:
a drive spindle connected to the at least one release element;
a bevel gear arrangement connected to the drive spindle;
wherein the electric motor has a motor shaft that is drivingly connected to the bevel gear arrangement for driving the drive spindle.

8. The release device according to claim 7, wherein the at least one release element is mounted on the drive spindle.

9. The release device according to claim 7, wherein the release device has an axis defining an axial direction and a radial direction, wherein the drive spindle is fixedly arranged in the axial direction in the housing.

10. The release device according to claim 9, wherein the drive spindle is a threaded spindle.

11. The release device according to claim 10, wherein the at least one release element has a thread engaging the drive spindle.

12. The release device according to claim 9, wherein the at least one release element is arranged in the housing and is secured against rotation in the housing.

13. The release device according to claim 12, wherein the at least one release element is provided with at least one torque support.

14. The release device according to claim 13, wherein the at least one torque support is an arm that projects in the radial direction away from the at least one release element.

15. The release device according to claim 14, wherein a free end of the at least one torque support is guided in the axial direction in a slot of the housing.

16. The release device according to claim 9, further comprising a receptacle, wherein the housing is received in the receptacle such that the housing is movable in the axial direction to a limited extent relative to the receptacle.

17. The release device according to claim 9, configured to be coupled to an end of the tool spindle.

18. The release device according to claim 1, wherein the at least one coupling element is a divided coupling ring comprised of two coupling ring parts.

19. The release device according to claim 18, wherein the two coupling ring parts are each supported to be pivotable about a respective pivot axis mounted on the housing.

20. The release device according to claim 1, wherein the at least one coupling element is provided on the housing.

21. The release device according to claim 1, wherein the at least one coupling element is detachably arranged on the housing.

22. The release device according to claim 1, wherein the at least one coupling element is a coupling ring.

23. The release device according to claim 1, wherein the counter coupling element is a coupling screw screwed onto a spindle shaft of the tool spindle.

24. The release device according to claim 1, wherein the pressure member is positioned in a movement path of the at least one release element.

25. The release device according to claim 1, wherein the at least one coupling element and the counter coupling element have support surfaces that in the basic position of the release device have an axial spacing from one another in the axial direction.

26. The release device according to claim 25, wherein, when the at least one release element contacts the pressure member, the housing and the drive spindle are movable in the axial direction to such an extent that the support surfaces rest against one another.

27. The release device according to claim 1, comprising a measuring shunt connected to the electric motor and a control device for the electric motor, wherein a voltage is generated at the measuring shunt as a function of a motor current of the electric motor and, based on a comparison of the voltage at the measuring shunt and a reference voltage performed in the control device, a switch-off signal for the electric motor is generated in the control device when the voltage at the measuring shunt surpasses the reference voltage, wherein the counter coupling element acts as a stop for the pressure member and the voltage generated at the measuring shunt surpasses the reference voltage when the pressure member reaches a stop position at the counter coupling element.

28. The release device according to claim 27, wherein the voltage at the measuring shunt is proportional to the motor current.

29. The release device according to claim 27, wherein the motor current is proportional to a motor torque.

* * * * *